United States Patent
Among et al.

(10) Patent No.: US 7,574,372 B2
(45) Date of Patent: Aug. 11, 2009

(54) METHODS AND APPARATUS FOR MANAGING A TOUR PRODUCT PURCHASE

(75) Inventors: Frank Among, Honolulu, HI (US); Jeffrey Freitas, Honolulu, HI (US)

(73) Assignee: Pan Travel Company LLC, Honolulu, HI (US)

( * ) Notice: Subject to any disclaimer, the term of this patent is extended or adjusted under 35 U.S.C. 154(b) by 464 days.

(21) Appl. No.: 10/031,405

(22) PCT Filed: May 17, 2001

(86) PCT No.: PCT/US01/10818

§ 371 (c)(1),
(2), (4) Date: Jan. 18, 2002

(87) PCT Pub. No.: WO01/90992

PCT Pub. Date: Nov. 29, 2001

(65) Prior Publication Data

US 2003/0110063 A1    Jun. 12, 2003

Related U.S. Application Data

(60) Provisional application No. 60/205,559, filed on May 22, 2000.

(51) Int. Cl.
  *G01C 21/34* (2006.01)
  *G06Q 10/00* (2006.01)
(52) U.S. Cl. .............................. 705/6; 705/5
(58) Field of Classification Search ............ 705/1, 705/5, 6, 7, 10, 14, 26, 27, 400, 37, 39, 36, 705/28, 29, 104.1, 102, 100
See application file for complete search history.

(56) References Cited

U.S. PATENT DOCUMENTS 5,253,166 A * 10/1993 Dettelbach et al. ............. 705/5
5,732,398 A *  3/1998 Tagawa ........................ 705/5

(Continued)

FOREIGN PATENT DOCUMENTS

WO    WO 89/07798    *  8/1989

(Continued)

OTHER PUBLICATIONS

Mary J. Cronin, Nets@work; The Travel Agents' Dilemma, Fortune, May 11, 1998.

(Continued)

*Primary Examiner*—Igor N Borissov
(74) *Attorney, Agent, or Firm*—Sughrue Mion, PLLC

(57) ABSTRACT

Components are displayed on a customer computer, each component having an attribute. A component is selected on a display by a customer. The information for the attribute for each selected component is manipulated by the customer. The manipulated attribute information for each selected component is transmitted to a server. Available travel packages are calculated, each available travel package including available components representing an inventory manipulated by a seller in real-time. The calculated different travel packages are simultaneously displayed on the customer computer. The available component from each different available travel package is selected on the display. A final travel package is created by assembling the selected available components from each different available travel package. A reservation of the created final travel package is requested by the customer. A confirmation that the final travel package is reserved for the customer is generated and transmitted to the customer computer.

15 Claims, 6 Drawing Sheets

U.S. PATENT DOCUMENTS

| | | | |
|---|---|---|---|
| 5,832,451 A | | 11/1998 | Flake et al. |
| 5,948,040 A | | 9/1999 | DeLorme et al. |
| 6,018,715 A | | 1/2000 | Lynch et al. |
| 6,023,679 A | | 2/2000 | Acebo et al. |
| 6,119,094 A | * | 9/2000 | Lynch et al. ................... 705/5 |
| 6,122,642 A | | 9/2000 | Mehovic |
| 6,275,808 B1 | * | 8/2001 | DeMarcken ................... 705/6 |
| 6,553,346 B1 | * | 4/2003 | Walker et al. ................... 705/1 |
| 7,340,402 B1 | * | 3/2008 | DeMarcken ................... 705/5 |
| 2001/0034625 A1 | * | 10/2001 | Kwoh ............................ 705/6 |
| 2006/0287897 A1 | * | 12/2006 | Sobalvarro et al. ............. 705/5 |

OTHER PUBLICATIONS

Michael Meehan, *Amedeus, Galileo raise fees despite analyst forecasts of trouble* (IDG.net), Computerworld, Dec. 4, 2000.

Kate Rice, *Web tries to tame wild world of consolidator fares*, webtravelnews.com, Feb. 5, 2001.

Karen Anderson Prikios, *Pegasus is flying high in Asia*, webtravelnews.com, Nov. 23, 2000.

*Travel by US Web Page*, www.travelbyus.com, Feb. 5, 2001.

Press release: *e-Travel Completes the Enterprise Travel Management Puzzle; Oracle Subsidiary Redefines B2B Arena for Coporate Travel Services with Lates ETM Suite*, Los Angeles, CA, Jul. 31, 2000.

Pegasus Powers ltsfair.com., Business Travel News , (Nov. 21, 2000).

Mary Ann McNulty, *Web Gains on GDS Domain,* infotech-travel.com, Pub Date: May 3, 1999.

Cheryl Rose, *Worldres Bypasses CRSs,* Pub Date: Jul. 14, 1997.

Press release: *Amadeus Launches "Consolidator Link," Connecting Travel Agencies to Consolidators* (Nov. 2, 2000).

Farelogix.com launches Internet airfare booking engine, Oct. 1, 1999.

Douglas Quinby, *Mark Travel Offers Web Booking System*, Jun. 5, 2000.

S-I/A document filed by, Expedia Inc, Nov. 8, 1999.

* cited by examiner

METHODS AND APPARATUS FOR MANAGING A TOUR PRODUCT PURCHASE

This is a National stage entry under 35 U.S.C. §371 of PCT Application No. US01/10818 filed May 17, 2001, which claims the benefit of priority from U.S. Provisional Application No. 60/205,559, filed May 22, 2000.

This application claims the benefit of U.S. Provisional Application No. 60/205,559, filed May 22, 2000, under 35 U.S.C. § 119(e).

BACKGROUND OF THE INVENTION

1. Field of the Invention

The present invention relates to methods and a system for managing a tour product purchase and more specifically, for permitting buyers to select a final option that includes customized components and multi-site reservations and vendors to directly manage tour product inventory online and in real-time.

2. Background of the Prior Art

In a prior art tour product purchasing process, tour products are purchased directly from a travel agency or a tour wholesaler without automation. A buyer inquires about a desired destination and provides information for desired components, including travel dates, preferred airline, flight times, hotel, and car company. The travel agency or the tour wholesaler then attempts to manually assemble the varying components based on price to produce a complete package. The travel agency or tour wholesaler must then manually determine if the inventory of individual components is available for sale for the selected date after the parameters have been chosen. However, the prior art process must be repeated manually by the travel agency or tour wholesaler each time a buyer alters a value of a parameter of any component to compare pricing (i.e., different room category, different car type, different travel date, etc.) until a final tour product is assembled and purchased. Thus, a significant time and cost disadvantage exists in the prior art method for selecting a tour package.

Additionally, prior art web servers on the Internet permit travel vendors to advertise and sell their products online. The prior art allows online buyers to purchase tour packages that include air, car, hotel and occasionally tour activities at a single price. This allows travel vendors to offer discounts in one area of the "package" while keeping the price of the individual components "hidden," and thus not competing directly with established distribution channels. However, this prior art system has various problems and disadvantages. For example, but not by way of limitation, in the prior art system, there are limited options regarding air, car, hotel and activities and the buyer must purchase the entire package without any customization.

This prior art system also has various problems and disadvantages. For example, but not by way of limitation, while this prior art exists in a limited form, choices are typically limited to air, car or hotel—but do not include customization capability for all three components of a typical "package" tour. In addition, buyers are not able to purchase one component of the tour separate from the others. Thus, customer choice is limited and customization capabilities for package tours are not provided.

Currently, none of the prior art systems allow for customization of package tours for multi-site destinations. In the prior art, if the consumer wishes to travel to multiple destinations in one trip, these destinations must be booked separately, which does not allow for the discounts provided in a "packaged" tour price. Prior art exists for multi-site air reservations, but these are published fare databases and do not offer discount fares or airfares in conjunction with other travel components typical of a package deal. The prior art airline component reservation systems are based on the 4 major central reservation systems (CRS) (i.e., SABRE, APOLLO/GALILEO, AMADEUS, WORLDSPAN). Although data stored on the CRS's is valuable, it comes at a steep price, a fee is charged to the vendor per ticket sold or reservation made. Additional prior art includes independent systems which bypass the CRS and allow for direct booking of participating vendors via the Internet. These CRS bypass systems are available both to travel agents via Web links, and online directly to consumers. The majority of these systems manage regular "published" fares, although some incorporate a limited inventory of "package" tours and wholesale inventory. Those systems which do bypass the CRS and allow for direct booking at a reduced fee do not currently allow for multi-site destination booking.

To manage inventory of components with a prior art travel wholesaler or reseller, the prior art vendor sends daily or weekly facsimile messages (i.e., S and R) reports showing dates which may be closed out for sale and are thus unavailable, or may open up inventory on dates which may have been previously closed out. This tedious and labor intensive prior art procedure can result in errors due to the nature of human involvement and inherent delays in updating information. Additional prior art includes limited capability of managing wholesale inventory via an Internet connection. Currently, these prior art systems are subscriber based and limited in scope and capability. For example, real-time inventory management, which includes real-time interaction with the vendor database, is currently only available in hotel booking systems.

Thus, the prior art tour product purchase systems have various problems and disadvantages. For example, because wholesale and tour inventory is offered as an inclusive "package", customer choice is limited. In addition, there is no online capability for booking a customized or mix-and-match "package" tour which includes multiple destinations. The prior art air reservation CRS requires significant fees payments to the "middleman" which increases costs to consumers. CRS bypass systems are limited in scope and capability and do not allow for real-time inventory management of wholesale and tour inventory.

SUMMARY OF THE INVENTION

An object of the present invention is to overcome the various problems and disadvantages of the prior art.

Another object of the present invention is to provide a database and server that holds all of the various components a buyer may want to "mix and match" to produce a desired, customized tour product.

It is yet another object of the present invention to allow a vendor to instantly confirm and manage inventory for all selected suboptions of any components sold by the vendor, which enables a quick and easy electronically ticketed transaction.

It is still another object of the present invention to provide a system that gives a potential buyer the ability to instantly mix and match suboptions for various components, and then easily mix and match additional suboptions for other components to compare price conveniently.

It is another object of the present invention to allow a buyer to book a customized tour product which includes multiple destinations. This capability allows for multiple air reservation bookings in conjunction with other "package" inventory such as hotel and car at each destination.

To achieve these and other objects, there is provided a method for selecting a final option using a client, comprising displaying a plurality of components received in said client, each of said plurality of components having a parameter, and allowing a user to input and manipulate information for said parameter of selected ones of said plurality of components. Also, the client transmits to a server said parameter information received from said user for said selected ones of said components, the client receives from said server a plurality of options generated in response to said transmitted parameter information, each of said plurality of options comprising at least one suboption that corresponds to a value of one of said selected ones of said components and is selected in accordance with said parameter information, said client sending to said server said final option selected by said user from one of said plurality of options, and the client provides said user with a confirmation generated by said user in response to user-provided reservation information, wherein said method is performed for at least two destinations. Further, the at least one suboption represents inventory that can be immediately confirmed as available and manipulated by a third party in real-time.

Additionally, a method for processing a final option using a server is provided, comprising generating in said server and transmitting to a user interface a plurality of components for use at a plurality of destinations, each of said plurality of components having a parameter, said server receiving information for said parameter of at least one of said plurality of components for use in at least two of said plurality of destinations. The method further comprises generating and transmitting a plurality of options to said user interface, each of said plurality of options comprising at least one suboption that corresponds to a value for selected ones of said plurality of components and is generated in accordance with suboption availability information received in said server from a third party. The method also comprises said server transmitting to said user interface a request for reservation confirmation data from a user in accordance with said final option selected by said user from said plurality of options, and outputting to said user a confirmation generated in response to said reservation confirmation data, wherein said third party can directly an immediately modify levels of inventory of said at least one suboption.

In the present invention, yet another method of purchasing a final option is provided, that comprises providing a user with a plurality of components for a plurality of sequential destinations, each of said plurality of components having a parameter, receiving parameter information from said user, and in a single transmission, providing said parameter information for selected ones of said plurality of components to a processor. The method also comprises generating a plurality of options for said plurality of sequential destinations, in response to said parameter information, each of said plurality of options comprising at least one suboption having a value for each of said selected ones of said components, said suboption generated in accordance with said parameter information and said user selecting a final option from said plurality of options. Additionally, the method comprises sending a confirmation to said user indicative of an electronic reservation of said final option, wherein an availability of said at least one suboption is determined in accordance with information directly updated in real time by a third party.

Further, a system for selecting a final option is provided, comprising a client system that receives a plurality of components, each of said plurality of components having a parameter configured to store user-provided information, receives a plurality of options generated in response to said user-provided information, and outputs said final option selected from said plurality of options by a user. A server system is also provided that generates and transmits, to said client system, said plurality of options, each of said plurality of options including a plurality of destinations and comprising at least suboption that has a value corresponding to one of said plurality of components and is selected in accordance with said parameter information, wherein said server system is directly updateable by a third party in real-time in response to an inventory level of at said least one suboption.

Also, a client system for selecting a final option is provided, comprising an input system receiving a plurality of input signals that comprises a first input signal comprising a plurality of components, each of said plurality of components having a parameter with a user-determined value, and a second input signal comprising a plurality of options, each of said plurality of options having a suboption comprising a value corresponding to one of said plurality of components and generated in accordance with said user-determined value of said parameter. The client system further comprises an output system generating a plurality of output signals, said plurality of output signals comprising a first output signal comprising said user-determined value of said parameter for at least one of said plurality of components, and a second output signal comprising a final option selected from said plurality of options, wherein said output device is configured to change said second input signal in response to a user input. The final option comprises a plurality of destinations corresponding to said components in an itinerary having a single price.

Further, a system for selecting a final option is provided, comprising a plurality of parameters, each of said parameters configured to store information, and a plurality of components simultaneously presented in a display, each of said plurality of components displaying at least one of said plurality of parameters in said display. The system also comprises an information source that provides said information stored in at least one of said plurality of parameters in response to said display, and a plurality of options generated in response to said information, each of said plurality of options comprising at least one suboption having a value corresponding to selected ones of said plurality of components, said plurality of options selected in accordance with said stored information for a plurality of destinations, and an inventory monitor that classifies said at least one suboption as one of available and unavailable, prevents said unavailable suboption from inclusion in said plurality of options. The inventory monitor allows the available suboption to be included in said plurality of options, wherein said final option is selected from said plurality of options.

As another preferred embodiment of the present invention, a server system for selecting a final option is provided, comprising a first system that generates a display comprising a plurality of components, each of said plurality of components having a parameter configured to store information provided by a user, and a second system that receives said user-provided information for said parameter of at least one of said plurality of components and generates a plurality of options, each of said plurality of options including at least one suboption having a value selected in accordance with said user-provided information and corresponding to one of said plurality of components. The server system receives said final option that has a plurality of destinations and is selected by a user from said plurality of options, and a third party can adjust availability and price of said plurality of options in accordance with inventory levels of said at least one suboption.

Also, a user interface for selecting an option is provided, having a first screen that comprises a first object comprising at least one field for a user to enter information corresponding to an itinerary, and a second object comprising a plurality of components indicative of corresponding travel options. Each of said components has at least one parameter that receives parameter information from a user, and each of said travel options has a plurality of sequential destinations. The user interface also comprises an activation object that transmits said information entered by said user in said first and second objects to a processor that monitors and determines availability of a suboption corresponding to one of said plurality of components, said processor generating a plurality of options in accordance with an inventory level of each of said plurality of components.

Further, a method for updating inventory information is provided, comprising directly accessing a data storage medium having said inventory information, selecting one of a plurality of inventory review options, reviewing one of a plurality of properties in a plurality of destinations in accordance with said selecting step, selecting one of a plurality of update options, and updating inventory information in said storage medium in response to said one of said plurality of update options, wherein a third party can access said data storage medium by a client system.

BRIEF DESCRIPTION OF THE DRAWINGS

The accompanying drawings, which are included to provide a further understanding of preferred embodiments of the present invention and are incorporated in and constitute a part of this specification, illustrate embodiments of the invention and together with the description serve to explain the principles of the drawings.

DETAILED DESCRIPTION OF THE INVENTION

Reference will now be made in detail to the preferred embodiment of the present invention, examples of which are illustrated in the accompanying drawings. One of ordinary skill in the art can extend the tour package purchase system to other online product selection systems.

In the present invention, the terms are meant to have the definition provided in the specification, and are otherwise not limited by the specification. In this invention, the term "component" refers to various tourism product or service categories available for selection, such as air travel, hotel accommodations, car rental and various tour activities.

The term "parameter" refers to data fields that are located within each component and are capable of storing and communicating information entered by a buyer. For example, an airline component may include a preferred airline, destination and origin, and travel times and dates. Based on this terminology, a component may have one or more parameters, and a user may either enter information in any number of parameters in a component or decline to enter information in a parameter. Once information has been entered in a parameter required for selection of the component, such as, for example a checkbox indicating whether a component has been selected, the component is said to have been selected for further processing, as discussed below.

The term "suboption" represents a value of a selected component, wherein the buyer has entered parameter information required for the component to be selected. A suboption can be chosen by a server. For example, an actual airline flight ticket represents a suboption for a selected airline travel component.

The term "option" includes suboptions combined and priced together to form a package for price comparison with other options. For example, if a user has provided parameter information to select airline and hotel components, an option may include an actual airline ticket suboption for the airline component and a hotel reservation suboption for the hotel accommodations component.

The term "final option" refers to one of the plurality of options selected for purchase by a user. For example, a user may select a final option by comparing the price of several options.

Figure 1:
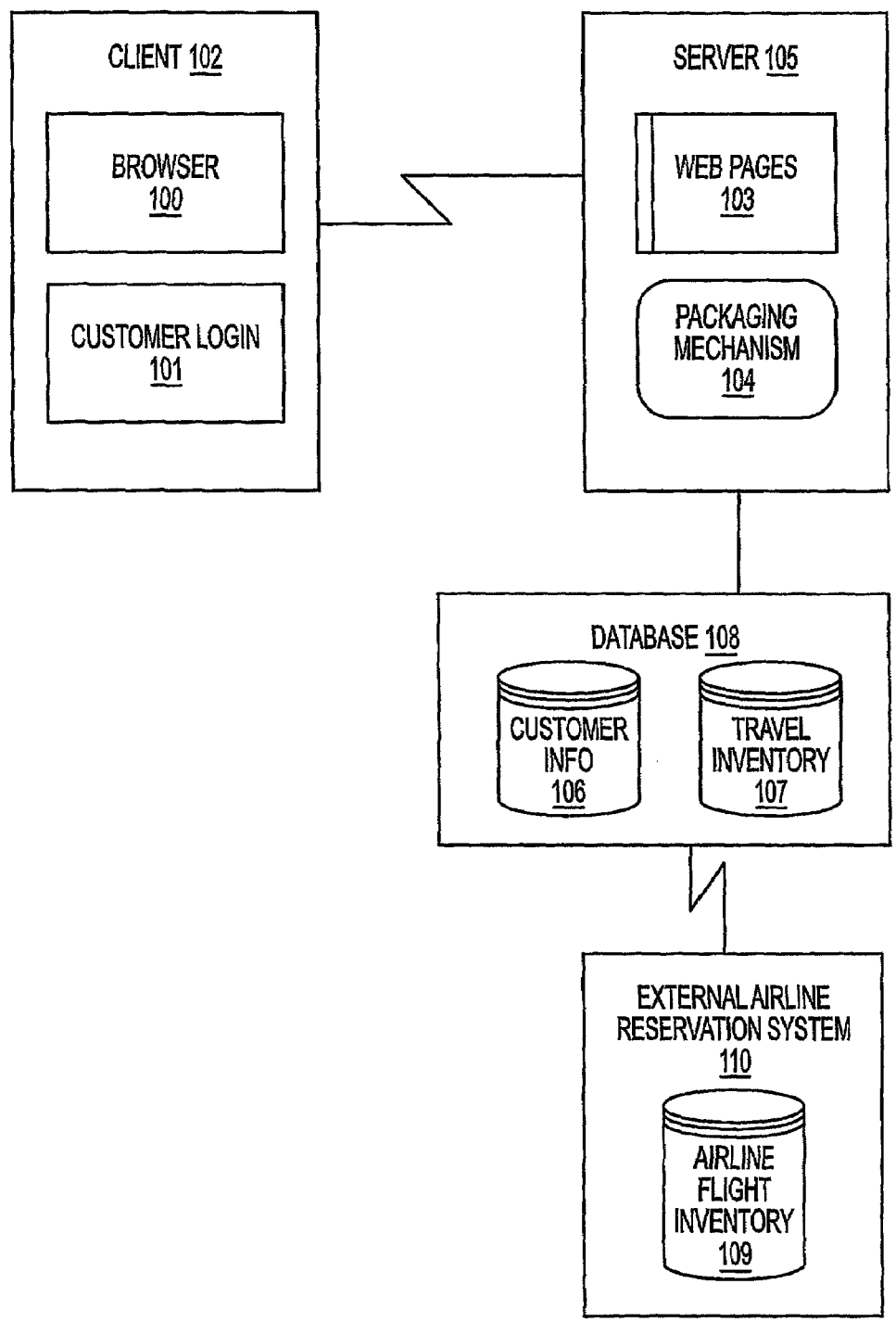
FIG. 1 illustrates a system for managing a travel tour package according to a preferred embodiment of the present invention.

FIG. 1 illustrates a client/server system for managing a tour product purchase according to a preferred embodiment of the present invention. The client 102 includes a Web browser 100 that permits the buyer to view content and optionally a security system 101 requiring a login that authorizes the buyer to access the client/server system. Devices that couple the client 102 to the server 105, such as a wireless or land line modem, may also be provided in the present invention. Additionally, the present invention may operate as an Intranet or a closed client/server system without Internet access.

The server is connected to a database 108 that houses data necessary to operate the preferred embodiment of the present invention. The server 105 stores and processes information for the web pages 103, that the client 102 receives for the buyer to view with the browser 100. Additionally, the server 105 accesses information from the database 108 includeing, but not limited to, travel inventory 107 and customer information 106. The travel inventory 107 includes data for the hotel database, the car rental database, the activity database, a database of inventories and prices from the various vendors. The customer information database 106 includes client and customer information and identification and client tracking information. The server 105 provides the mechanism for creating customized tour packages 104 from the selected travel options as provided by the database and determined by the client. The packaging mechanism also checks for availability of inventory, searches for the lowest price options, and automatically applies discounts for qualified travelers.

Figure 2:
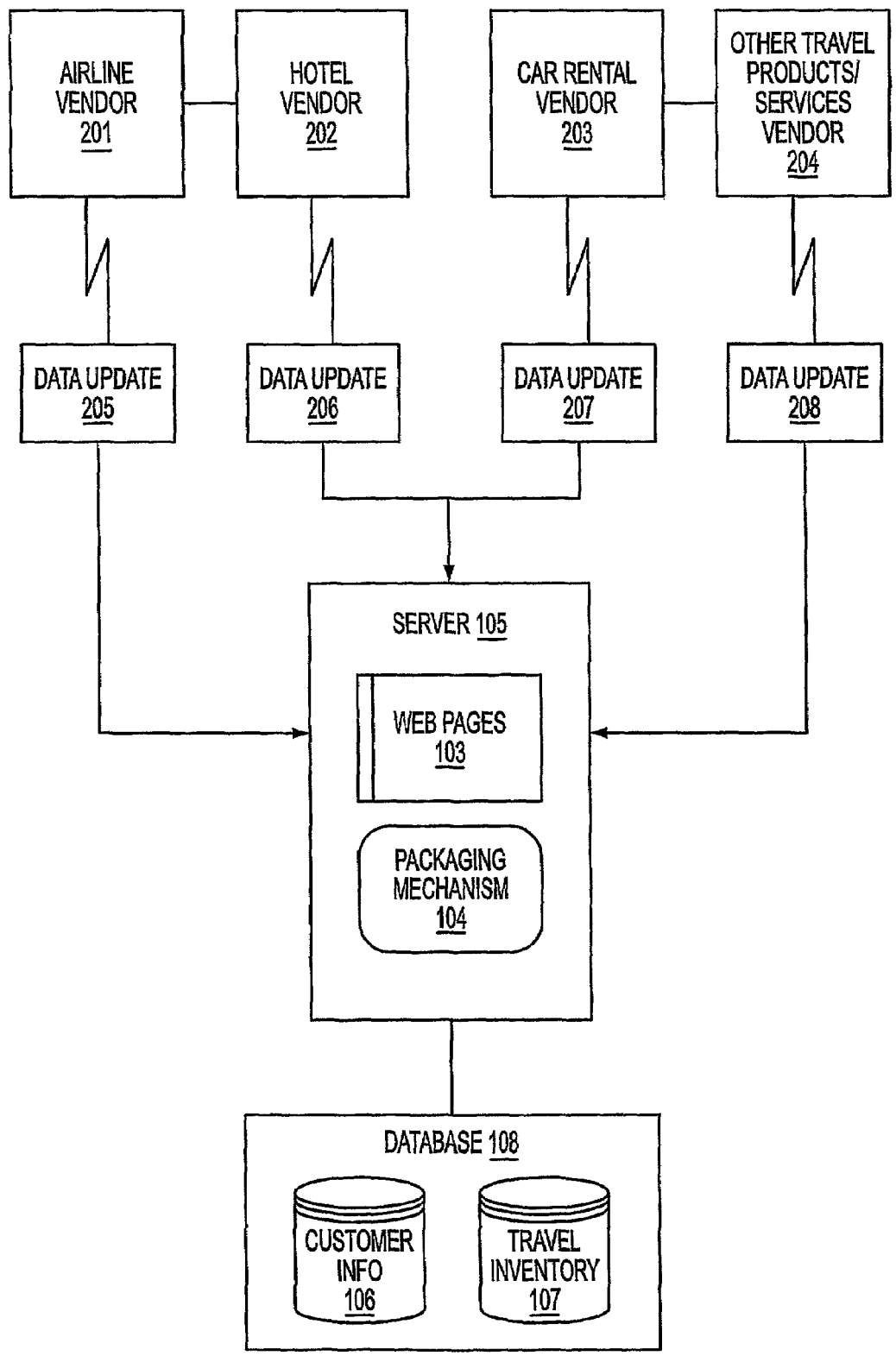
FIG. 2 illustrates a system for vendor update according to the preferred embodiment of the present invention.

Additionally, flight information and airline flight inventory 109 may be housed on an external database 110, accessed by interfacing with a prior art CRS booking engine (e.g., SABRE, APOLLO/GALILEO, AMADEUS, WORLDSPAN) to enable real time flight class availability. FIG. 2 illustrates a vendor update system according to the preferred embodiment of the present invention. Vendor access to a central server 105 is a key that makes the system work smoothly. Vendors may directly adjust inventory levels in a number of ways. For example, vendors may close out certain dates that are not available for sale by clicking on a specific date on a calendar displayed on a vendor interface 201, 202, 203, 204 close out a specified range of dates, adjust price levels for a specific date or a range of dates, or offer a "block" of rooms at a certain price that would be decremented as the number of rooms are sold.

Each vendor has an interface 201, 202, 203, 204 and can communicate with the central server 105 directly to facilitate data updates 205, 206, 207, 208 and either close out or open up inventory corresponding to suboption availability in real time, 24 hours a day via the a Web browser, utilizing a unique login name and password. The preferred embodiment of the present invention bypasses the prior art CRS at a considerable cost savings for participating vendors. The key element is the direct manipulation by vendors of inventory data, which is instantly uploaded and changeable.

Direct inventory control of suboptions by vendors removes the prior art "middleman" from the procedure. All data input by vendors is stored in a master database, 108 on the central server 105. The invention allows timely and fresh data to be available for anyone wishing to purchase a travel package. Accordingly, only products that are actually available are displayed. For example, if a suboption such as a hotel property or specific car type from a certain car company is sold out for a particular day desired by a prospective buyer, the unavailable suboption will not be offered for that component.

Figure 3:
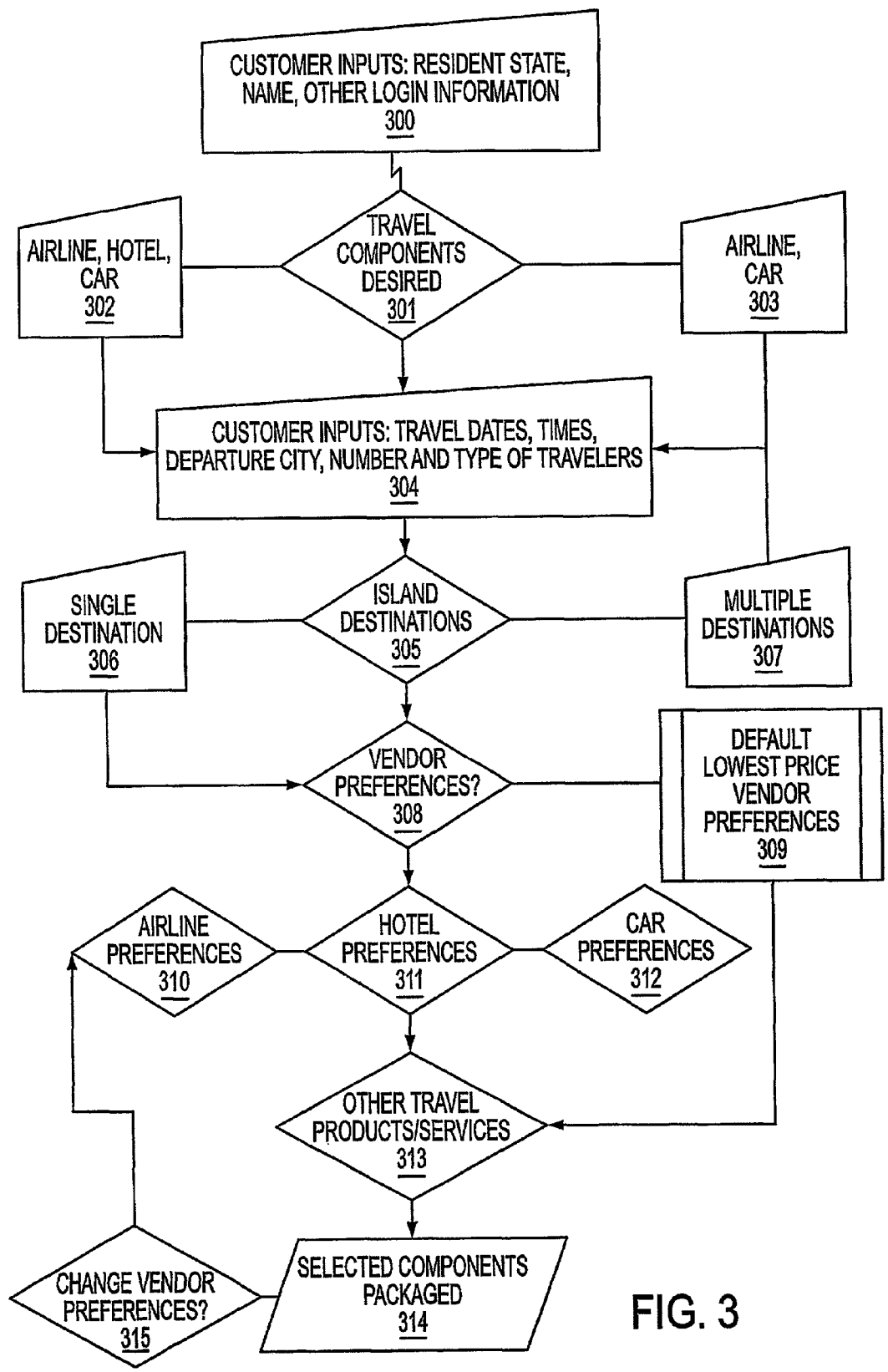
FIG. 3 illustrates a customer package selection process according to the preferred embodiment of the present invention.

FIG. 3 illustrates a parameter data input and component selection method according to the preferred embodiment of the present invention. In a first step 300, the buyer, with access to the communication network, first inputs State of residence and other login information. The State of residence is utilized as a locational qualifier to determine the types of rate structures to present to the buyer. In certain markets, special rates are reserved only for local residents. For example, Hawaiian residents can receive special rates in Hawaii, while different rates exist for visitors from the United States mainland and foreign visitors. The preferred embodiment of the present invention allows for automatic generation of specialized pricing for qualifying individuals (based upon identified State of residence).

The buyer then determines which travel components he/she is interested in 301; options include car, airline and hotel 302 or car and airline 303. The buyer inputs information regarding travel dates, times, city or origin, the number and type of travelers 304. The buyer is prompted whether the trip will include a single or multiple destinations 305. If multiple destinations (e.g. islands in the Hawaiian chain) are selected 307, the buyer is prompted to input further parameter information for each destination 304. Once the buyer has entered all of the necessary information for the multiple destinations 307, the island destinations selection step 305 is complete. The buyer may then choose to determine vendor preferences 308 for airline 310, hotel 311, or car rental 312. If the buyer chooses not to input vendor preferences, the system will automatically provide default vendors 309 based upon the lowest price options. The system will also prompt the buyer regarding other travel products and services which may be available for purchase 313. Once the buyer has provided parameter information for the selected components of a tour package, a click on the "price this itinerary" button will instantly take all variables into consideration and return with a selection of the lowest price options that may interest the buyer, 314. After reviewing the automatically generated package the buyer may opt to change vendor preferences, 315, and/or have the system provide further options. Some airlines allow the "bulk air fares" that are normally packaged with other suboptions of given components, to be sold alone. Most car and hotel properties may either be bought singularly or in combination with additional components, as the buyer desires. The extraordinary flexibility and the ease with which the different suboptions may be combined, priced and recombined in different options and then re-priced online via a network connection, is an advantage of the present invention.

Figure 4:
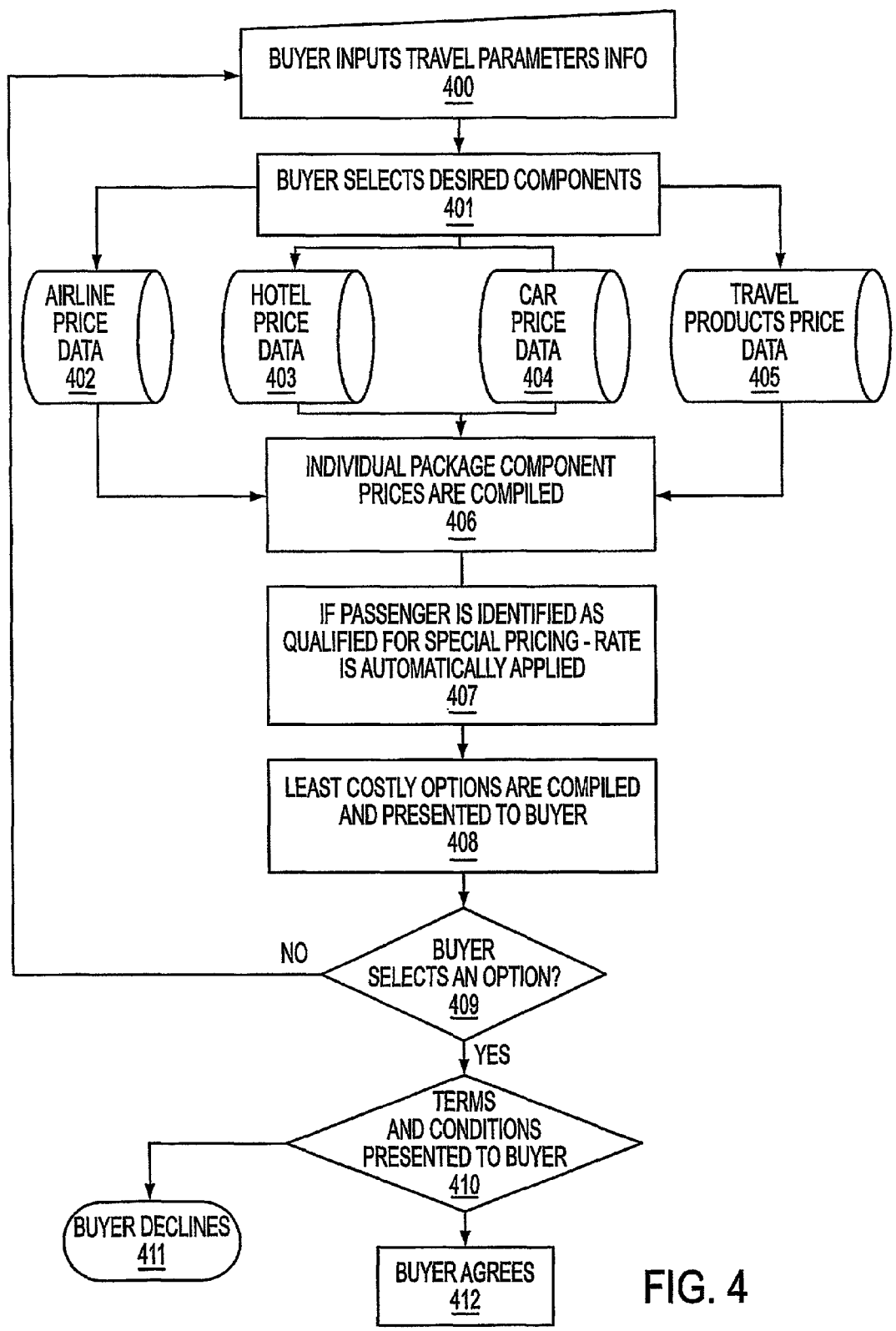
FIG. 4 illustrates a method for selecting a tour package according to the preferred embodiment of the present invention.

FIG. 4 illustrates a method for a buyer to purchase a tour package according to the preferred embodiment of the present invention. After the buyer has provided parameter information for components 400 and selected the desired components 401, suboptions are generated and priced by the server 105 for the selected components from the airline, hotel, car and other travel products/services price databases 402, 403, 404, 405. The information is sent to the server for compilation 104, which returns with the lowest priced options 408. If the passenger is identified as qualified for special pricing (such as a resident of Hawaii) the pricing rate is automatically applied to the qualifying travel suboptions 407.

After deciding upon the final option, the buyer then may select 409 a presented "package", which sends the suboption data to the internal server 105 and the external airline reservation system 110 for live inventory availability and flight schedules if the airline component has been chosen. After the selection 409 of the final option, a list of terms and conditions specific to the selection is presented 410. The buyer may then decline 411, thereby ending the transaction, or agree 412 and proceed to a subsequent phase of the checkout process.

Figure 5:
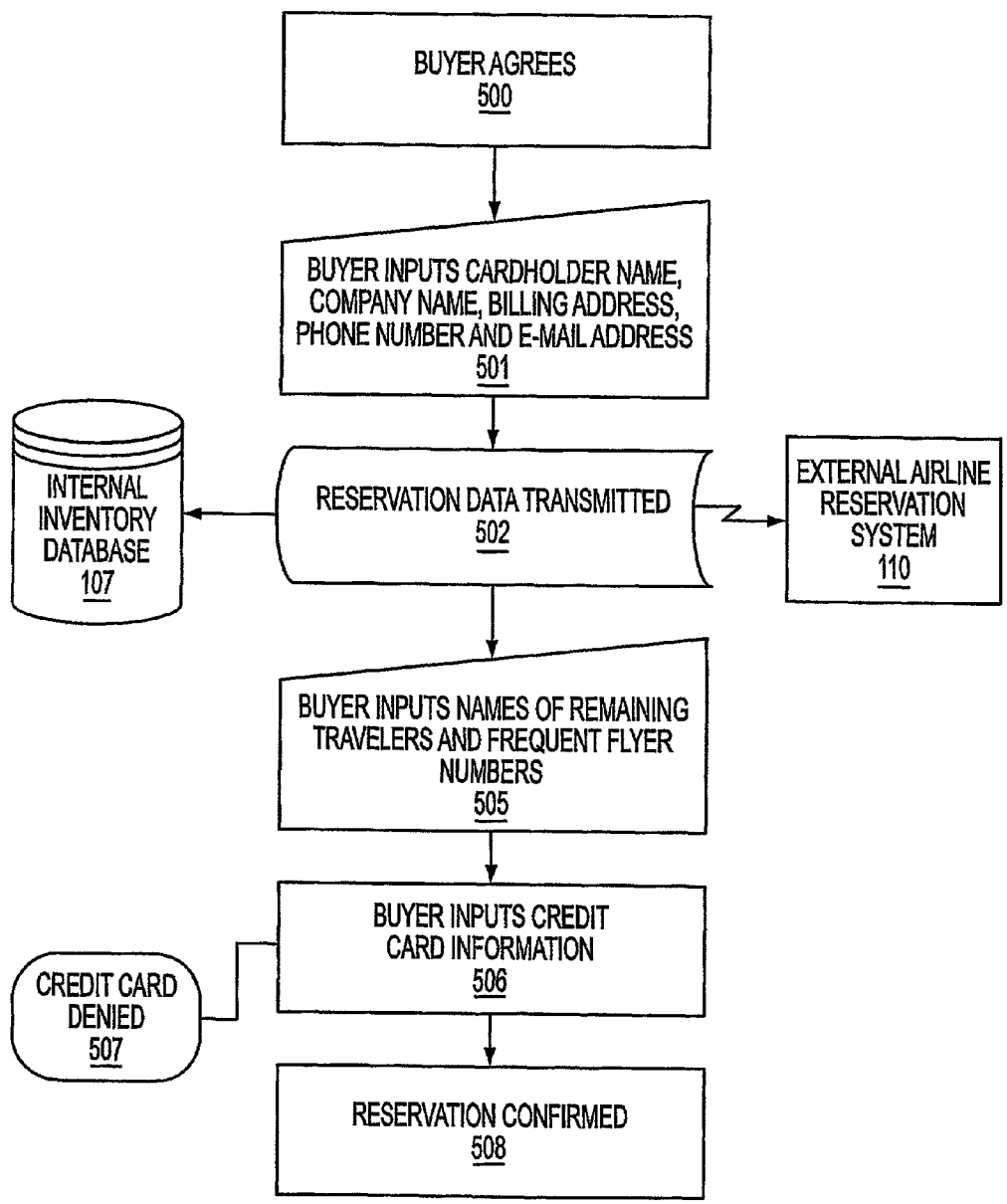
FIG. 5 illustrates a method for purchasing a selected tour package according to the preferred embodiment of the present invention.

FIG. 5 illustrates a method for purchasing a final option selected by the buyer according to the preferred embodiment of the present invention. Once the buyer has agreed 500 to purchase the final option, the buyer inputs 501 the name, billing address, company name, phone contact and email address of the person that is traveling and is the credit card holder. Once all buyer data has been input 501, the information is sent 502 to the appropriate system 107, 110. If the airline component has been chosen and a suboption has thus been generated as a part of the selected final option the external airline reservation system may be accessed 110. Once the "continue" button has been clicked, the buyer is prompted for additional information to complete the reservation. For example, the names of any additional travelers and/or frequent flyer number information may be input 505. The buyer information is prepopulated into the name field along with the phone number, as well as an optional business phone number.

After the final reservation information needed to complete a passenger reservation has been input 505, the buyer must input the credit card information 506, or hold the reservation of the final option in the system for up to 48 hours. The credit card may be denied 507 or the reservation may be confirmed 508. The vendors may then invoice the packager for the individual services provided.

Figure 6:
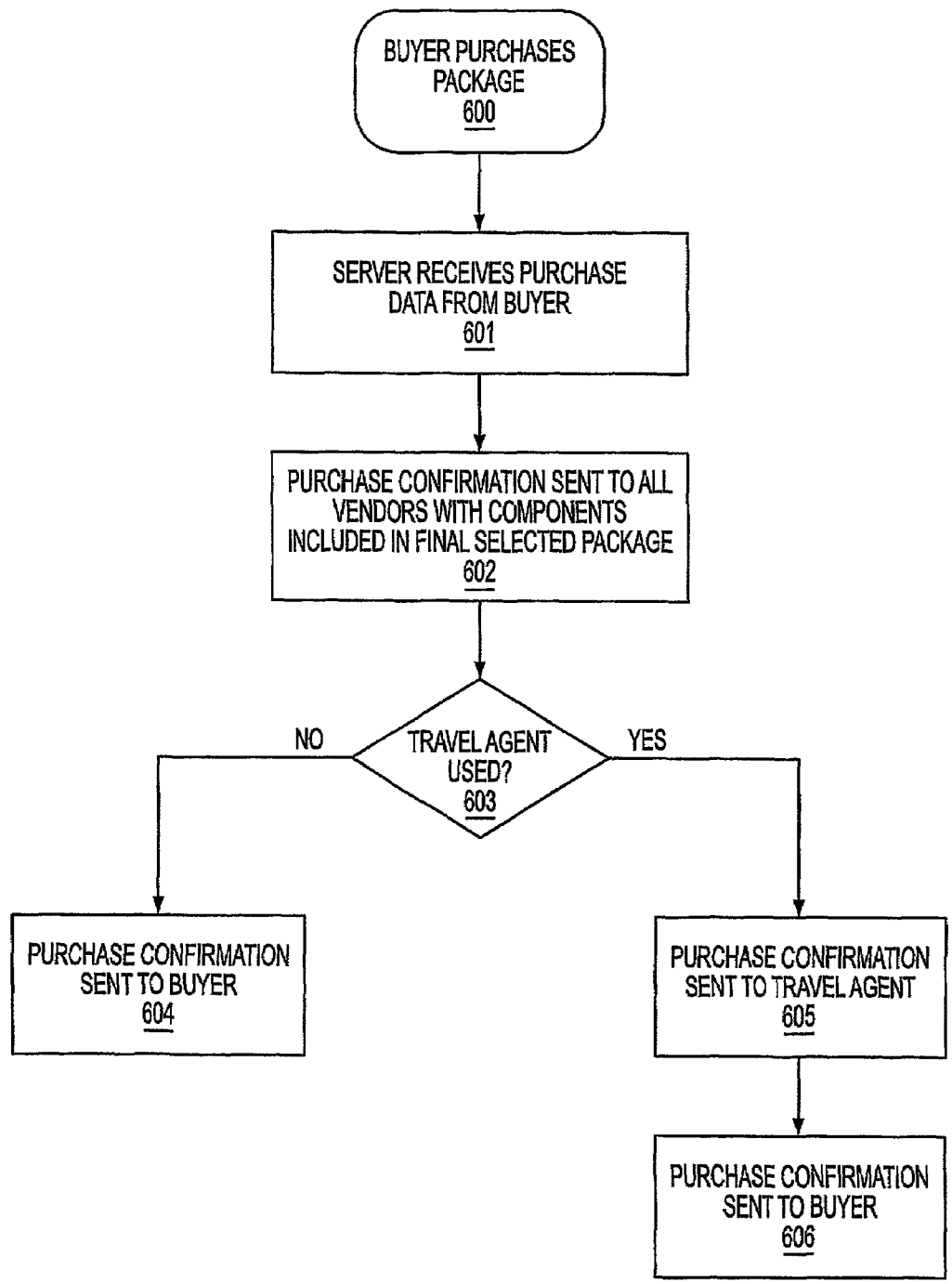
FIG. 6 illustrates a confirmation process according to the preferred embodiment of the present invention.

FIG. 6 illustrates a confirmation process according to a preferred embodiment of the present invention. Once the credit card information is input and the buyer has purchased the final option 600, a match is done by the central server that receives the buyer's response 601 to ensure that the credit card holder's name and address match the account, and if an approval is returned for the full amount, the system automatically completes the purchase by removing funds from the buyer's account.

A confirmation message (e.g., email) is instantly sent 602 to all vendors that have a suboption corresponding to a selected component in the final option. The confirmation message verifies that a reservation was made and includes the buyer name, the products or services purchased, a tracking number, and the record locator of the air component, if any.

In addition to sending confirmation messages to the vendors 602, a confirmation message (e.g., email) is also sent to any travel agent 606 that booked the package or suboptions of the final option, and to the buyer 604,607, if the buyer's contact information (e.g., email address) is available. A follow-up daily reconciliation message (e.g., email or fax) is also sent to all vendors at the end of each day re-listing all bookings of suboptions selected as part of a final option made that day as a verification.

Another embodiment of the present invention allows for the tracking of sales by an individual or by an entity. An individual may enroll online in an incentive program and receive special access to the site via a login name and password. In addition to receiving special offers from participating vendors, the members can track sales and receive incentive points for rewards and prizes. Travel agents can manage pending reservations, commission payments, cancellations and incentive points online, including a running tally of total incentive points earned and a list of potential rewards. Further, an organization or corporation may track sales to earn incentive rewards and prizes from the participating vendors, as well as monetary incentives based on a percentage of sales. All pertinent information is presented only to the specific entity logged in to the site with a valid login and password.

The present invention has various advantages. For example, the present invention allows a buyer to simultaneously mix and match various components of a tour package to generate suboptions and then compare tour price package process offers ease of use and flexibility to alter schedules instantaneously. The mix and match capability extends to various inventories not in the current CRS and includes the ability to book multiple site destinations in one comprehensive itinerary. Further, the present invention also permits direct, real-time, 24-hour access to the database on a central server, which eliminates the prior art errors, and reduces the cost of the tour package by eliminating the "middleman."

It will be apparent to those skilled in the art that various modifications and variations can be made in methods and apparatus for managing a tour product purchase of the present invention without departing from the spirit or scope of the invention. Thus, it is intended that the present invention cover the modifications and variations of this invention provided they come within the scope of the appended claims and their equivalents. For example, it is understood that one of ordinary skill in the art may provide a confirmation message through electronic mail, facsimile, telephone message, hard copy, or any other available communication method. Further, it is understood that while the present invention discloses the use of the Internet, one of ordinary skill in the art would also use an Intranet or a closed network system to communicate between the client system and the server. Thus, the additional embodiments that would have been obvious to one skilled in the art are included in the present invention.

What is claimed is:

1. A computer-implemented method for selecting a final travel package comprising at least two destinations, comprising:

displaying on a customer computer a plurality of components, said plurality of components comprising air travel, hotel accommodations, and car rental, wherein each of said plurality of components having at least one attribute;

selecting on a display via user input by a customer at least one component of said plurality of components;

manipulating by the customer information for at least one attribute for each selected component;

transmitting by the customer computer to a server said manipulated attribute information received from said customer for each selected component;

based on the transmitted manipulated attribute information, calculating by the server a plurality of available travel packages, each of said available plurality of travel packages comprising at least two available components, each of the at least two available components corresponding to a value of each of the selected components, wherein each of the at least two available components represents inventory manipulated by a seller in real-time;

receiving and displaying simultaneously by said customer computer from said server the calculated plurality of travel packages;

selecting on the display via the user input by the customer at least one of the available components from each of at least two different displayed available travel packages;

creating a final travel package by assembling the selected available components from each of the at least two different displayed available of travel packages;

requesting by the customer a reservation of the created final travel package;

transmitting by the customer computer to said server said created final travel package and the reservation request;

generating by the server a confirmation that the final travel package is reserved for the customer in response to the transmitted reservation request; and transmitting by the server to the customer computer the generated confirmation, wherein the created final travel package is a customized travel package.

2. The method of claim 1, further comprising:

coupling said customer computer to a network via a communications device;

providing said customer with a single user interface;

viewing by said customer at least two destinations via the single user interface;

and generating by said customer computer a single itinerary having a single price from said customer selection of the at least one of the available components from each of at least two different displayed available travel packages via the single user interface.

3. The method of claim 1, further comprising:

selecting by said customer multiple airfares in a sequence of said at least two destinations.

4. The method of claim 1, further comprising:

sorting by the server said calculated plurality of available travel packages according to price; and transmitting by the server to said customer computer the plurality of available travel packages sorted in a predetermined order based on the price.

5. The method of claim 1, further comprising:

transmitting by said customer computer customer-generated payment information to said server in response to said confirmation; and receiving by said customer computer one of an approval and a denial of said final travel package in response to said customer-generated payment information.

6. The method of claim 5, wherein said transmitting by said customer computer customer-generated payment information to said server in response to said confirmation comprises transmitting by said customer computer to said server at least one of payment account information, billing address, company name, telephone contact information, and electronic mail address of said customer.

7. The method of claim 1, further comprising:

receiving by said customer computer a customer-generated discount code indicative of a discount criteria of said customer;

transmitting said discount code to said server;

generating by the server a discount corresponding to said discount code.

8. The method of claim 1, wherein said seller comprises a vendor, the method further comprising:

selling said inventory via said server by the vendor, and updating a datastore storing said inventory by the server by changing availability of said inventory in response to receiving said final travel package.

9. The method of claim 8, wherein said selling step further comprising:

selling said selected component comprising one of a hotel room, a vehicle rental, an air transportation ticket, a travel tour and a travel service or a product.

10. The method of claim 1, wherein said transmitting by the server to the customer computer the generated confirmation further comprising:

receiving by said customer computer said confirmation from said server for at least one of said seller and a travel agent.

11. The method of claim 1, wherein said displaying step further comprising:

displaying reservation accommodations received in said customer computer.

12. The method of claim 11, wherein said transmitting by the customer computer to a server said manipulated attribute information received from said customer for each component of the selected type of travel packages further comprising:

transmitting attribute information for at least one of:

said air travel comprising at least one of desired travel dates, desired travel times, desired airlines, and desired flight requests;

said car rental comprising at least one of desired vehicle type, desired vehicle rental price, and desired vehicle rental company;

said hotel accommodations comprising at least one of specific room type, hotel classification, hotel chain, and hotel rating; and said reservation accommodations comprising surface tours, travel insurance, luggage, clothing, video entertainment, audio entertainment, and food products.

13. The method of claim 1, further comprising: combining by said customer at least one first component of a first travel package with at least one second component of a second travel package creating said final travel package; and transmitting by said customer computer said at least one first component and said at least one second component to said server; and calculating by the server a price for said created final travel package based on the transmitted first and second components, wherein the travel packages are displayed together with prices.

14. The computer-implemented method according to claim 1, further comprising:

when executing said calculating of the plurality of available travel packages options, for each of the plurality of calculated available travel packages, checking by the server in real-time availability of the inventory corresponding to a component of the option-travel package being calculated.

15. The computer-implemented method according to claim 1, wherein the manipulating step further comprising:

in putting a value for said at least one attribute of the at least one selected component.

* * * * *

UNITED STATES PATENT AND TRADEMARK OFFICE
CERTIFICATE OF CORRECTION

| | | |
|---|---|---|
| PATENT NO. | : 7,574,372 B2 | Page 1 of 1 |
| APPLICATION NO. | : 10/031405 | |
| DATED | : August 11, 2009 | |
| INVENTOR(S) | : Frank Among | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 605 days.

Signed and Sealed this

Fourth Day of January, 2011

David J. Kappos
*Director of the United States Patent and Trademark Office*